Patented Sept. 1, 1936

2,052,670

UNITED STATES PATENT OFFICE 2,052,670

ARYL-ARSENO-ARSENIDES AND PROCESS OF MAKING THE SAME

Hans Schmidt, Wuppertal-Vohwinkel, Germany, assignor to Winthrop Chemical Company, Inc., New York, N. Y., a corporation of New York No Drawing. Application July 15, 1932, Serial No. 622,832. In Germany July 28, 1931

18 Claims. (Cl. 260—15)

The present invention relates to the manufacture of new arylarseno-arsenides and to new products obtainable thereby.

In accordance with the invention arylarseno-arsenides are obtainable by the reaction of primary aromatic arsines with inorganic trivalent arsenic compounds which arylarseno-arsenides are therapeutically valuable as such or can be converted into therapeutically valuable products.

The aromatic arsines used as starting materials have the general formula $ArAsH_2$. "Ar" may be the phenyl group or a phenyl group substituted by substituents which are desirable for therapeutic action. Such substituents are, for example, OH-groups, amino-groups, alkyl- and acyl-amino-groups.

The production of the new arylarseno arsenides can be carried out by causing primary arylarsines, if desired in the form of their salts, to react, for example, with arsenic trioxide or arsenic trihalides, such as arsenic trichloride. The reaction is carried out in aqueous solution or in organic solvents, the prevailing conditions being either alkaline, neutral or acid. Or, for example, the solution in which the arsine is produced can be used directly for the reaction. Hereby the solvent can be so selected that the two components are soluble therein, but the product of the reaction is insoluble and is precipitated on its formation.

According to the proportions and conditions employed products are obtained which differ in arsenic content and in color tone. For example, two inorganic arsenic atoms may be present while three are combined with a carbon atom of the aryl group, as in the case of the 4-hydroxy-3-amino-benzene-arseno-arsenide, which is obtainable according to Example 14 below as an intermediate product, and corresponds to the formula:

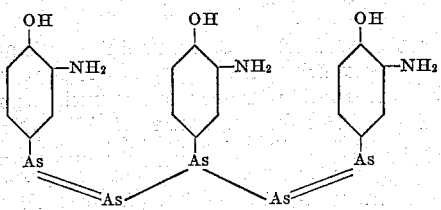

This invention is, however, not limited to this proportion because it has been found that according to the present process well-defined aryl-arseno-arsenides of the formula:

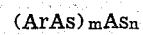

wherein Ar stands for a radical of the benzene series, $m$ and $n$ signify the same or different whole numbers, or their derivatives such as their hydrochlorides, formaldehyde-bisulfite and formaldehyde-sulfoxylate compounds may contain the inorganically and organically bound arsenic in different proportions. These compounds are characterized as well-defined arseno-arsenides by their color and behaviour to oxidizing agents, such as iodine, hydrogen peroxide, oxygen and the like.

For the production of derivatives which dissolve with a neutral reaction the new products, in so far as they contain amino groups, can be caused to react with formaldehyde-bisulfite or formaldehyde-sulfoxylate, one or more formaldehyde-bisulfite or formaldehyde-sulfoxylate radicals entering according to the proportions and conditions employed. Instead of formaldehyde-bisulfite formaldehyde and bisulfite can also be used separately.

In the appended claims these compounds will be called "soluble amino derivatives of arylarseno-arsenides".

The new products, for example, the hydrochlorides or formaldehyde-bisulfite or formaldehyde-sulfoxylate compounds can moreover be caused to react with metallic compounds to form addition or complex compounds. The process can be carried out by treating the arylarseno-arsenides in solution with metal salts, if desired, with the addition of an alkali. The addition compounds are suitably precipitated by appropriate precipitants. The formaldehyde-bisulfite or formaldehyde-sulfoxylate radical can also be introduced subsequently into metallic compounds obtainable in this manner. For the therapeutic action valuable metal compounds, such as gold-, silver-, copper-, tin-, lead-, zinc-, bismuth-, antimony-, vanadium-, chromium- and other compounds come into consideration.

For the sake of brevity the term "arylarseno-arsenides" as used in the appended claims will comprise the free arylarseno-arsenides as well as salts thereof and the aforesaid complex compounds.

In all operations of the process care must be taken to exclude oxygen as far as possible. Moreover the products may advantageously be stored with the exclusion of oxygen.

The fact that the new compounds themselves, and also the derivatives and metallic addition products thereof, display valuable therapeutic properties, which are in any case not inferior to those of the known arseno benzene derivatives and in some cases even surpass the same, is a matter for surprise since the new products contain only a portion of the arsenic combined with carbon and a portion in inorganic form. It thus becomes possible to attain the desired object with half of the costly organic components, which, moreover, in consequence of their poisonous oxidation products demand particular caution.

The new compounds are chiefly for use as injection preparations for infectious diseases. They are generally from yellow to brown powders, being soluble in water as such or in the form of their salts and derivatives.

The following examples further illustrate the invention without restricting it thereto:

Example 1

A solution of 20 grams of 4-hydroxy-3-aminophenylarsine acetate in 200 ccs. of acetone is united while stirring with a solution of 10 grams of arsenic trichloride in 100 ccs. of acetone. The resulting light yellow precipitate is filtered with suction, washed with acetone and dried in a desiccator. There is obtained a light yellow hydrochloride readily soluble in water.

Example 2

A solution of 20 grams of 4-hydroxy-3-aminophenylarsine acetate in 150 ccs. of methyl alcohol is united while stirring at about $-5°$ to $-15°$ C. with a solution of 10 grams of arsenic trichloride in 100 ccs. of methyl alcohol. The temperature rises somewhat and the solution assumes a yellow coloration. After standing for a short time the reaction product is precipitated by pouring the solution into acetone while stirring. The precipitate is filtered, washed with acetone, whereby any excess of the starting materials still present is removed and dried in vacuo. After drying, the 4-hydroxy-3-aminophenylarseno arsenic hydrochloride formed is obtained as a yellow powder, readily soluble in water with a reddish yellow coloration.

It contains about 40% of arsenic. This compound in aqueous solution takes up a large quantity of iodine. It is fairly stable in the air and is only slowly oxidized in the presence of air.

Example 3

A solution of 20 grams of arsenic trichloride in 150 ccs. of methyl alcohol is combined with a solution of 20 grams of 4-hydroxy-3-aminophenylarsine acetate in 100 ccs. of methyl alcohol. The solution becomes reddish brown with a slight increase of temperature. The hydrochloride formed is precipitated by pouring the solution into acetone or ether while stirring and dried in vacuo. There is obtained a brownish colored powder which dissolves readily in water and possesses a higher arsenic content than the product obtainable in accordance with Example 1. This compound contains about 47% of arsenic. When the conversion is performed at a low temperature and the precipitation of the yellow solution is immediately carried out by introducing into acetone, a yellow product is obtained containing about 40% of arsenic. But when the solution is allowed to stand for a short time, the temperature is raised and the color becomes deeper, and a brownish product containing a high arsenic content is obtained by precipitating in acetone.

The reaction can also be carried out, for example, in aqueous acid or aqueous alkaline solution and the product formed in each case can be liberated or precipitated by appropriate additions.

Example 4

11 grams of para-aminophenylarsonic acid in 150 ccs. of water and 140 ccs. of concentrated hydrochloric acid are reduced by means of zinc dust in the customary manner. To the filtered solution containing the para-aminophenylarsine there is added a strongly diluted alkaline solution of 5 grams of arsenious acid. A deep yellow coloration immediately appears indicating the formation of the arseno-arsenic compound. The same is precipitated immediately by adding sodium acetate until the solution is neutral to Congo red, filtered with suction and washed.

For further working up, the yellow paste obtained is mixed with water, dissolved in just the necessary quantity of dilute hydrochloric acid and 5 ccs. of 30% formaldehyde solution are added. After a few minutes the liquid sets to a jelly. A solution of 5 grams of sodium bisulfite is added and the whole is shaken in a bottle. After 1–2 hours neutralization is effected by means of dilute caustic soda and after filtration the compound formed is precipitated by pouring the solution into dilute alcohol while stirring. There is obtained a brownish yellow powder which dissolves readily in water to a neutral solution. The aminobenzene-arseno-arsenic compound which is obtained as intermediate product may also be converted into a soluble hydrochloride.

Example 5

7.4 grams of formaldehyde sulfoxylate are added to a solution of 12 grams of the hydrochloride obtainable in accordance with Example 2 in 50 ccs. of water. The solution is made up to 100 ccs. in a bottle and shaken. A dense precipitate is soon formed. After a few hours this is dissolved by the addition of 2 normal caustic soda until the reaction is neutral and the filtered solution is precipitated by pouring the solution into ethyl or methyl alcohol while stirring. After separating and drying in a desiccator a yellow powder is obtained, which dissolves readily in water to a neutral solution. The compound contains about 31% of arsenic.

When the chloride obtainable in accordance with Example 1 is used, a yellow powder is likewise obtained.

In a corresponding manner the reaction can be carried out with the brownish hydrochloride obtainable in accordance with Example 3, a yellowish powder being obtained, which dissolves readily in water to a neutral solution. The compound contains about 36% of arsenic.

When, for example, a smaller quantity of formaldehyde sulfoxylate is caused to react in alkaline solution, there is likewise obtained a water-soluble product which, however, contains fewer formaldehyde sulfoxylate radicals than that obtained by the above method of working.

Example 6

4.5 ccs. of 30% formaldehyde solution are added to an aqueous solution of 10 grams of the hydrochloride obtainable in accordance with Example 2. After a few minutes the liquid sets to a jelly. After standing for a short time this is stirred with a solution of 4.5 grams of sodium bisulfite, made up to 100 ccs. in a bottle and shaken. After a few hours neutralization is effected by means of dilute caustic soda, the solution is filtered after standing for a short time and precipitated by pouring into, for example, ethyl alcohol while stirring. After separating and drying in vacuo, the compound formed is obtained as a yellow powder which dissolves readily in water to a neutral solution of a reddish yellow coloration.

Example 7

9 grams of the compound, obtainable in accordance with Example 5 by using the hydrochloride obtainable in accordance with Example 2, are dissolved in water and a solution of 4 grams of gold chloride is added while stirring. A deep brown precipitate is formed which is dissolved by the addition of dilute caustic soda. The product is precipitated by pouring the solution into ethyl alcohol while stirring. After separating and drying in vacuo, the gold compound is obtained as a dark brown powder which dissolves readily in water to a neutral solution.

In a similar manner a gold addition product can be obtained, for example, from the formaldehyde-bisulfite compound described in Example 6. In both cases the gold can also be employed in other proportions.

The hydrochloride obtainable in accordance with Examples 2, 3 and 16 and the hydrochloride of the para-aminobenzene-arseno-arsenide obtained as intermediate product according to Example 4, and the hydrochloride of the 4-hydroxy-3-aminobenzene-arseno-arsenide obtained as intermediate product according to Example 14 can be caused to react with gold chloride, for example, in methyl alcoholic solution and the addition product formed precipitated by pouring the dark colored solution into ether while stirring.

Example 8

A methyl alcoholic solution of 2.8 grams of stannous chloride is poured, while stirring, into an aqueous solution of 12 grams of the compound obtainable in accordance with Example 5, using the hydrochloride obtainable in accordance with Example 3. The precipitate produced is dissolved by means of dilute caustic soda. The solution is filtered and precipitated by pouring into ethyl alcohol while stirring. After separating and drying in vacuo the tin compound is obtained as a yellow-brown powder, readily soluble in water to a neutral solution. The compound contains about 31% of arsenic and about 10% of tin.

Example 9

12 grams of the compound obtainable in accordance with Example 5, paragraph 1, are dissolved in about 50 ccs. of water with the addition of a small quantity of ice. A solution of 2 grams of cupric chloride in a small quantity of water is stirred in. A brown precipitate is formed, which is dissolved to a neutral solution by the addition of dilute caustic soda. The solution is filtered and the copper addition compound formed is precipitated by pouring, while stirring, into alcohol in the form of a brown powder, readily soluble in water to a neutral solution. This product contains about 29% of arsenic and about 6% of copper.

A soluble copper addition compound can also be obtained, for example, by the action of freshly precipitated cupric hydroxide.

In an analogous manner a copper addition compound may be prepared from the product obtainable in accordance with Example 5, paragraph 2.

Example 10

6 grams of the compound obtainable in accordance with Example 5, using the hydrochloride obtainable in accordance with Example 3, are dissolved in water. An aqueous solution of 2.4 grams of lead acetate is poured in while stirring. Dilute caustic soda is added until the dark brown precipitate produced just redissolves. The solution is filtered and the compound formed is precipitated by pouring into alcohol while stirring. After separation and drying in vacuo, the lead addition product is obtained as a brownish red powder which dissolves readily in water to a neutral or slightly alkaline solution.

Example 11

An aqueous solution of 2 grams of zinc chloride is poured, while stirring, into an aqueous solution of 12 grams of the compound obtainable in accordance with Example 6. After neutralizing with dilute caustic soda and filtering, the compound formed is precipitated by pouring the solution into alcohol while stirring. After separating and drying, the zinc addition product is obtained as a brown powder which dissolves readily in water to a neutral solution. The new compound contains about 27% of arsenic and about 6.5% of zinc.

Example 12

A methyl alcoholic solution of 1.1 grams of crystallized cupric chloride is added to a methyl alcoholic solution of 5 grams of hydrochloride obtainable in accordance with Example 2. The product is precipitated by pouring the solution into acetone while stirring, the precipitate is filtered with suction, washed with acetone and dried in vacuo. It is then dissolved in a small quantity of water, a solution of 1.4 grams of formaldehyde sulfoxylate is poured in while stirring and the whole is shaken for several hours in a closed bottle. Dilute caustic soda is then added until the reaction is neutral, whereupon the precipitate formed dissolves. The solution is filtered and the product precipitated by pouring the solution into alcohol while stirring. After separating and drying the copper addition product of the formaldehyde sulfoxylate compound formed is obtained as a brownish powder, readily soluble in water.

Example 13

14 grams of para-phenyl-glycine-arsonic acid are reduced to the arsine by means of zinc dust in the customary manner. The acid solution filtered off with suction from the zinc dust is combined with a solution of 5 grams of arsenious acid in dilute caustic potash lye. The solution dyes in yellow shades. Sodium acetate is added thereto until Congo paper no longer shows a blue tint. The yellow voluminous arseno arsenide thus precipitated is filtered with suction, the precipitate is washed and the paste is dissolved in the required quantity of dilute caustic soda lye. It is filtered off and precipitated by pouring into alcohol while stirring. After separation and drying in vacuo the sodium salt of the phenyl-glycine-arseno-arsenide is obtained as a brownish yellow powder easily soluble in water.

Example 14

A solution of 50 grams of 4-hydroxy-3-amino phenyl-arsine acetate dissolved in 300 ccs. of methyl alcohol is poured, while stirring, into a solution, cooled with ice, of 20 grams of arsenious acid in one liter of water and 200 ccs. of 5 normal caustic soda lye. The solution dyes in red shades. After about 10 minutes the arseno-arsenide compound thus produced is precipitated by 150 ccs. of 5 normal acetic acid. After standing for a short time it is filtered with suction and washed with water. The paste remaining in the suction filter is equally distributed by shaking with water (total volume 500 ccs.) and just dissolved by the addition of 5 normal hydrochloric acid. 22.5 ccs. of a 30% solution of formaldehyde are added thereto. After 10 minutes 22.5 grams of sodium bisulfite are added to this solution and then it is shaken. After one hour and a half it is neutralized with dilute caustic soda lye, filtered after standing again for a short time, and the product thus prepared is precipitated by pouring in alcohol while stirring. After separating and drying the formaldehyde-bisulfite compound of 4-hydroxy-aminobenzene-arseno-arsenide is obtained as a yellow powder easily soluble in water with a neutral reaction and having a yellow-reddish shade.

The paste of the 4-hydroxy-3-aminobenzene-arseno-arsenide as obtained above can also be shaken with 50 grams of formaldehyde-bisulfite. After some days solution takes place. It is filtered and an analogous product is obtained by pouring the solution into methyl alcohol while stirring and working up as described above. The conversion with formaldehyde-bisulfite can also be performed in an alkaline solution. The hydroxy-aminobenzene-arseno-arsenide compound obtained as intermediate product may also be converted into a soluble hydrochloride.

*Example 15*

9 grams of 4-hydroxy-3-aminobenzene-arseno-arsenide-formaldehyde-bisulfite prepared in accordance with Example 14 are dissolved in water, a solution of 1.5 grams of silver nitrate is added thereto and the whole neutralized with dilute caustic soda lye. The mixture is filtered off, the filtrate poured into alcohol while stirring, and the precipitating silver addition product of the cognate arsenoarsine compound is obtained after filtering with suction and drying in vacuo. It forms a dark brown powder easily soluble in water. A silver addition compound may for instance be obtained by treating the compound obtained according to Example 13 with silver nitrate and soda lye.

*Example 16*

5.6 grams of 3, 4-benzimidazole-arsine (prepared from 3, 4-benzimidazole-arsonic acid by reduction with zinc dust) are dissolved in 100 ccs. of methyl alcohol while adding 20 ccs. of 5 normal hydrochloric acid. 200 ccs. of water and ice are added thereto and then the whole combined with a dilute solution of 2 grams of arsenious acid in dilute caustic potash lye. The solution dyes in yellow shades. After about 15 minutes the arseno-arsenide is precipitated with the aid of sodium acetate, then it is filtered with suction and washed. The paste thus obtained is dissolved in dilute hydrochloric acid and the filtered solution is precipitated by pouring into acetone while stirring. After separating and drying the hydrochloride of the benzimidazole-arseno-arsenide is obtained as a yellow compound soluble in water. The yellow solution is decolorized by hydrogen peroxide.

I claim:—

1. In the process of preparing new arsenic compounds, the step which comprises causing a primary aromatic arsine to react with an inorganic trivalent arsenic compound selected from the group consisting of arsenic trioxide, alkali metal salts of arsenious acid, and arsenic trihalides in the presence of a solvent, the reaction conditions being acid to alkaline.

2. In the process of preparing new arsenic compounds, the step which comprises causing a primary aromatic arsine of the benzene series to react with a compound of the group consisting of arsenic trioxide, alkali metal salts of arsenious acid and arsenic trihalides in the presence of a solvent, the reaction conditions being acid to alkaline.

3. Process as claimed in claim 1 in which the primary aromatic arsine is used in the form of a salt of an acid.

4. Process as claimed in claim 2 in which the primary aromatic arsine is used in the form of a salt of an acid.

5. The process of preparing new arsenic compounds which comprises reacting upon a primary aromatic arsine with an inorganic trivalent arsenic compound selected from the group consisting of arsenic trioxide, alkali metal salts of arsenious acid, and arsenic trihalides in the presence of a solvent, the reaction conditions being acid to alkaline and causing a soluble metal salt of a therapeutically active metal selected from the group consisting of gold, silver, copper, tin, lead, zinc, bismuth, antimony, vanadium and chromium to react upon the arylarseno-arsenide formed.

6. Process which comprises reacting upon a primary aminoaryl arsine compound with an inorganic trivalent arsenic compound selected from the group consisting of arsenic trioxide, alkali metal salts of arsenious acid, and arsenic trihalides in the presence of a solvent, the reaction conditions being acid to alkaline and reacting upon the aminoarylarseno-arsenide formed with a compound of the group consisting of formaldehyde-bisulfite and formaldehyde-sulfoxylate.

7. Process which comprises reacting upon a primary aminoaryl arsine of the benzene series with an inorganic trivalent arsenic compound selected from the group consisting of arsenic trioxide, alkali metal salts of arsenious acid, and arsenic trihalides in the presence of a solvent, the reaction conditions being acid to alkaline and reacting upon the amino arylarseno arsenide formed with a compound of the group consisting of formaldehyde-bisulfite and formaldehyde-sulfoxylate, and causing a soluble metal salt of a therapeutically active metal selected from the group consisting of gold, silver, copper, tin, lead, zinc, bismuth, antimony, vanadium and chromium to react upon the arylarseno-arsenic compound formed.

8. Arylarseno-arsenides of the general formula $(ArAs)_m As_n$, wherein Ar stands for a radical of the benzene series, $m$ and $n$ signify whole numbers, in which the arsenic atoms of the arylarseno radicals are connected to each other through further arsenic atoms, which compounds are yellowish to brown powders and, as derivatives formed by salt formation of groups substituting the radical of the benzene series, are soluble in water and useful in therapy.

9. Aminoarylarseno-arsenides of the benzene series in which the arsenic atoms of the arylarseno radicals are connected to each other through further arsenic atoms, which compounds are yellowish to brown powders and, in the form of their salts, are soluble in water and useful in therapy.

10. Formaldehyde-bisulfite-aminoarylarseno-arsenides of the benzene series in which the arsenic atoms of the arylarseno radicals are connected to each other through further arsenic atoms, which compounds are yellowish to brown powders which dissolve in water to neutral solutions and are useful in therapy.

11. Formaldehyde - sulfoxylate-aminoarylarseno-arsenides of the benzene series in which the arsenic atoms of the arylarseno radicals are connected to each other through further arsenic atoms, which compounds are yellowish to brown powders which dissolve in water to neutral solutions and are useful in therapy.

12. Amino-hydroxyphenylarseno - arsenides in which the arsenic atoms of the arylarseno radicals are connected to each other through further arsenic atoms, which compounds are yellowish to brown powders and, in the form of their salts, are soluble in water and useful in therapy.

13. 3-amino-4-hydroxyphenylarseno- arsenides in which the arsenic atoms of the arylarseno radicals are connected to each other through further arsenic atoms, which compounds are yellowish to brown powders and, in the form of their salts, are soluble in water and useful in therapy.

14. (Formaldehyde-bisulfite-amino)-hydroxy-phenyl-arseno-arsenides in which the arsenic atoms of the arylarseno radicals are connected to each other through further arsenic atoms, which compounds are yellowish to brown powders which dissolve in water to neutral solutions and are useful in therapy.

15. (Formaldehyde - sulfoxylate - amino) - hydroxyphenylarseno-arsenides in which the arsenic atoms of the arylarseno radicals are connected to each other through further arsenic atoms, which compounds are yellowish to brown powders which dissolve in water to neutral solutions and are useful in therapy.

16. 3-(formaldehyde-bisulfite-amino) - 4 - hydroxyphenylarseno-arsenides in which the arsenic atoms of the arylarseno radicals are connected to each other through further arsenic atoms, which compounds are yellowish to brown powders which dissolve in water to neutral solutions and are useful in therapy.

17. 3-(formaldehyde-sulfoxylate-amino)-4-hydroxyphenylarseno-arsenides in which the arsenic atoms of the arylarseno radicals are connected to each other through further arsenic atoms, which compounds are yellowish to brown powders which dissolve in water to neutral solutions and are useful in therapy.

18. Derivatives of soluble amino derivatives of arylarseno-arsenides in which the arsenic atoms of the arylarseno radicals are connected to each other through further arsenic atoms, and which contain in a complex-like linkage a metal selected from the group consisting of gold, silver, copper, tin, lead, zinc, bismuth, antimony, vanadium, and chromium, which compounds are yellowish to brown powders and, in the form of their salts, are soluble in water and useful in therapy.

HANS SCHMIDT.